(12) United States Patent
Yamamoto et al.

(10) Patent No.: US 8,085,485 B1
(45) Date of Patent: Dec. 27, 2011

(54) LENS BARREL SUPPORT STRUCTURE AND OPTICAL DEVICE

(75) Inventors: Shusaku Yamamoto, Osaka (JP); Yukikazu Ujikane, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/037,371

(22) Filed: Mar. 1, 2011

(30) Foreign Application Priority Data

Jul. 16, 2010 (JP) ................. 2010-161368

(51) Int. Cl.
*G02B 7/02* (2006.01)
(52) U.S. Cl. ...................... 359/829; 359/827
(58) Field of Classification Search .............. 359/829, 359/827
See application file for complete search history.

(56) References Cited

U.S. PATENT DOCUMENTS

| 7,259,923 B2 | 8/2007 | Nuno et al. | |
| 2004/0042779 A1* | 3/2004 | Maeda et al. | 396/79 |

FOREIGN PATENT DOCUMENTS

| JP | 2001-116974 A | 4/2001 |
| JP | 2005-164620 A | 6/2005 |
| JP | 2009-031382 A | 2/2009 |

* cited by examiner

*Primary Examiner* — Scott J Sugarman
*Assistant Examiner* — James Jones
(74) *Attorney, Agent, or Firm* — Shinjyu Global IP

(57) ABSTRACT

A lens barrel support structure is provided that includes a base frame and a lens barrel. The base frame includes a first support portion, a second support portion, a third support portion, and a stopper. The lens barrel includes a substantially cylindrical shape body frame configured to accommodate at least part of an optical system, a first attachment portion fixedly coupled to the body frame and to the first support portion, a second attachment portion fixedly coupled to the body frame and to the second support portion, a third attachment portion fixedly coupled to the body frame and to the third support portion, and a receiver fixedly coupled to the body frame. The receiver and the stopper are disposed spaced apart and define a gap that extends along a first direction parallel to an optical axis of the optical system to allow the receiver to contact the stopper.

13 Claims, 15 Drawing Sheets

LENS BARREL SUPPORT STRUCTURE AND OPTICAL DEVICE

CROSS-REFERENCE TO RELATED APPLICATIONS

This application claims priority under 35 U.S.C. §119 to Japanese Patent Application No. 2010-161368 filed on Jul. 16, 2010. The entire disclosure of Japanese Patent Applications No. 2010-161368 is hereby incorporated herein by reference.

BACKGROUND

1. Technical Field

The technology disclosed herein relates to a lens barrel support structure that supports an optical system, and to an optical device having a lens barrel.

2. Background Information

An optical system that includes lenses and other such optical parts are used in silver halide cameras, digital cameras, and other optical devices. There are also optical devices that are equipped with a lens barrel for accommodating an optical system, and in which the lens barrel is attached to a main body. The lens barrel needs to support the optical parts, so a certain amount of strength is required of the connection between the lens barrel and the optical device body. A technique in which a cushioning member is disposed between the lens barrel and the main body is employed to prevent damage to the connection portion between these members in the event that the optical device is subjected to vibration, impact, etc.

For example, Japanese Patent Laid-Open Publication No. JP2001-116974 discloses a lens barrel comprising a first frame for holding an imaging lens, a second frame provided so as to engage with the first frame, and a cushioning member disposed compressably between the first frame and the second frame. Also, Japanese Patent Laid-Open Publication No. JP2005-164620, for example, discloses a lens barrel comprising an attachment member that protrudes from the outer side surface of a fixing frame and is fixed by a fastening member to an attached member, and an elastic member that is disposed in a pressurized state in a gap provided between the attached member and the attachment member, wherein the attached member and the attachment member are not in direct contact, at least in the optical axis direction.

With these techniques, however, an elastic member or other such cushioning member must be disposed between the lens barrel and the main body of the optical device, and this increases the number of parts.

Meanwhile, it is possible to fix a lens barrel at four or more locations to the main body of an optical device in order to ensure good strength at the connection portion between the lens barrel and the main body of the optical device. However, when a lens barrel and the main body of the optical device are fixed at four or more locations, strain is more likely to occur in the members during attachment than when they are fixed at three locations. As a result, it is difficult to attach the lens barrel accurately to the main body of the optical device.

Thus, with an optical device having a lens barrel, it is preferable if impact resistance can be ensured with a simple structure, while the lens barrel is accurately attached to the main body of the optical device.

SUMMARY

One object of the invention is to provide a lens barrel support structure that accurately attaches the lens barrel to the main body of the optical device, thereby effectively dispersing any force(s) exerted on the lens barrel and making the optical device more impact resistant.

In accordance with one aspect of the invention, a lens barrel support structure is provided that includes a base frame and a lens barrel. The base frame includes a first support portion, a second support portion, a third support portion, and a stopper. The lens barrel includes a substantially cylindrical shape body frame configured to accommodate at least part of an optical system, a first attachment portion fixedly coupled to the body frame and to the first support portion, a second attachment portion fixedly coupled to the body frame and to the second support portion, a third attachment portion fixedly coupled to the body frame and to the third support portion, and a receiver fixedly coupled to the body frame. The receiver and the stopper are disposed spaced apart and define a gap that extends along a first direction parallel to an optical axis of the optical system to allow the receiver to contact the stopper.

These and other objects, features, aspects and advantages of the present invention will become apparent to those skilled in the art from the following detailed description, which, taken in conjunction with the annexed drawings, discloses embodiments of the present invention.

BRIEF DESCRIPTION OF DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

1-1. Overall Configuration

The digital camera 2 according to an embodiment of the present invention will now be described through reference to the drawings.

Figure 1:
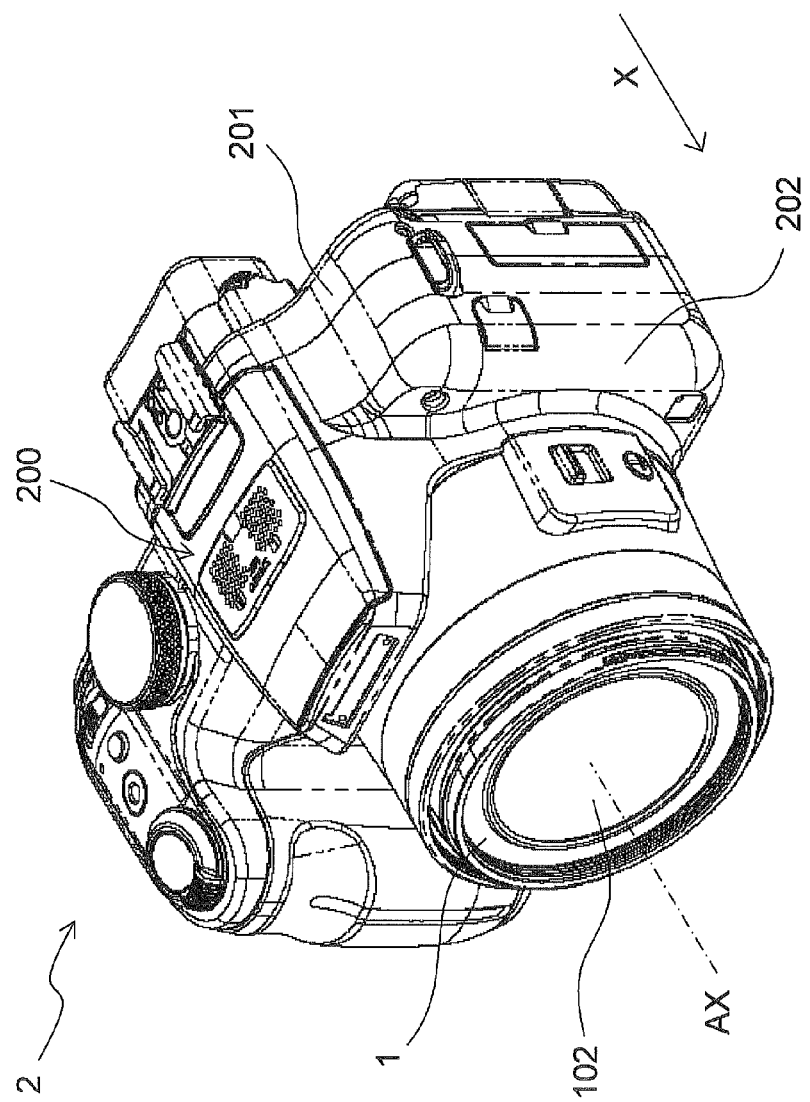
FIG. 1 is an oblique view of a digital camera 2.
Figure 2A:
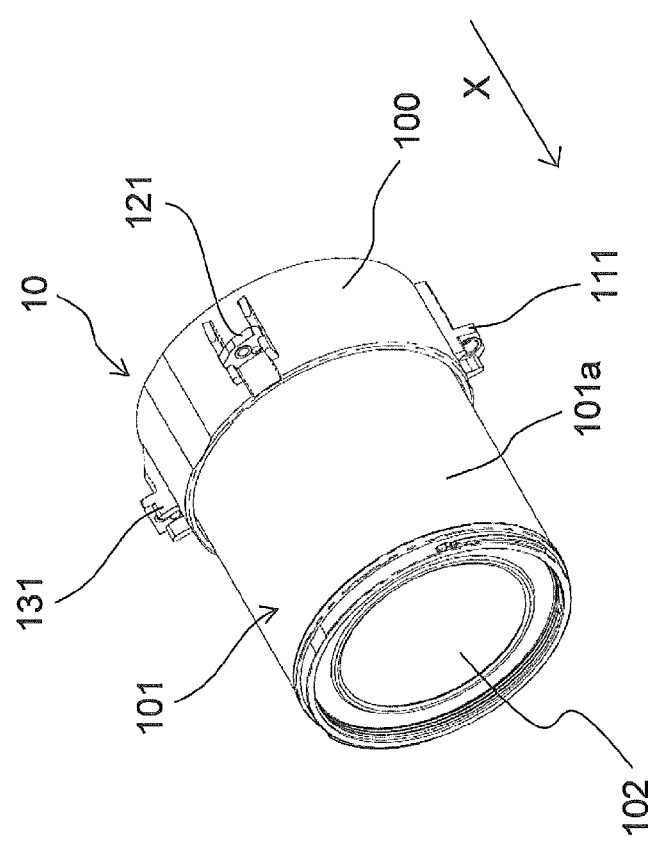
FIG. 2A is an oblique view of a lens barrel 1 when viewed from the X-axis positive side.
Figure 2B:
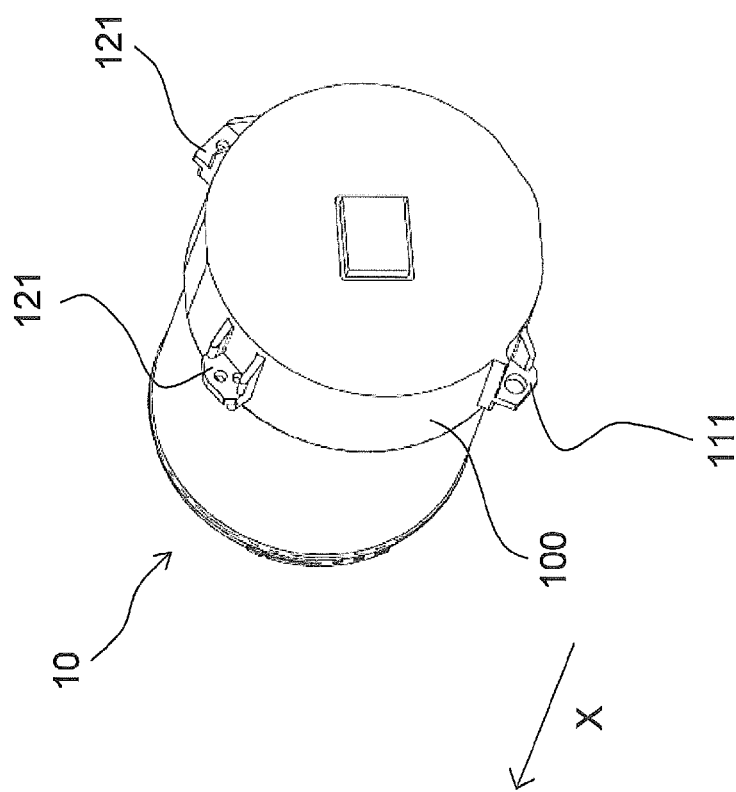
FIG. 2B is an oblique view of a lens barrel 1 when viewed from the X-axis negative side.
Figure 2C:
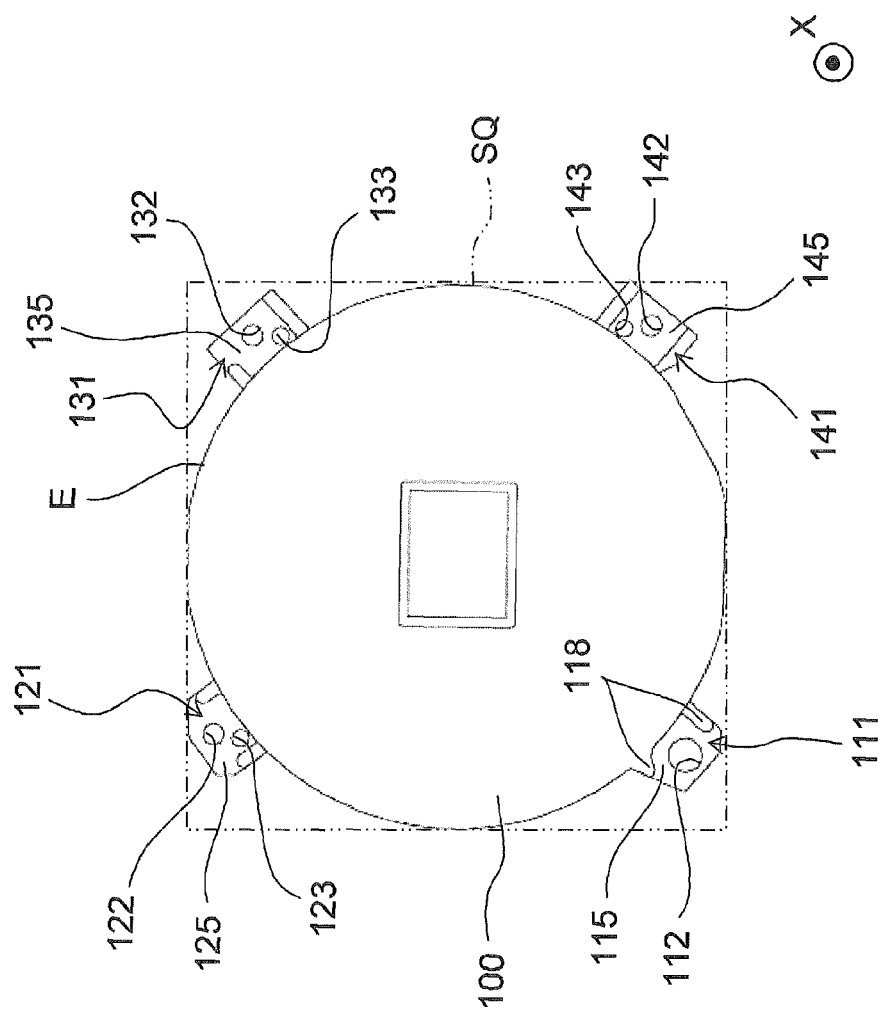
FIG. 2C is a rear view of the lens barrel 1.
Figure 3:
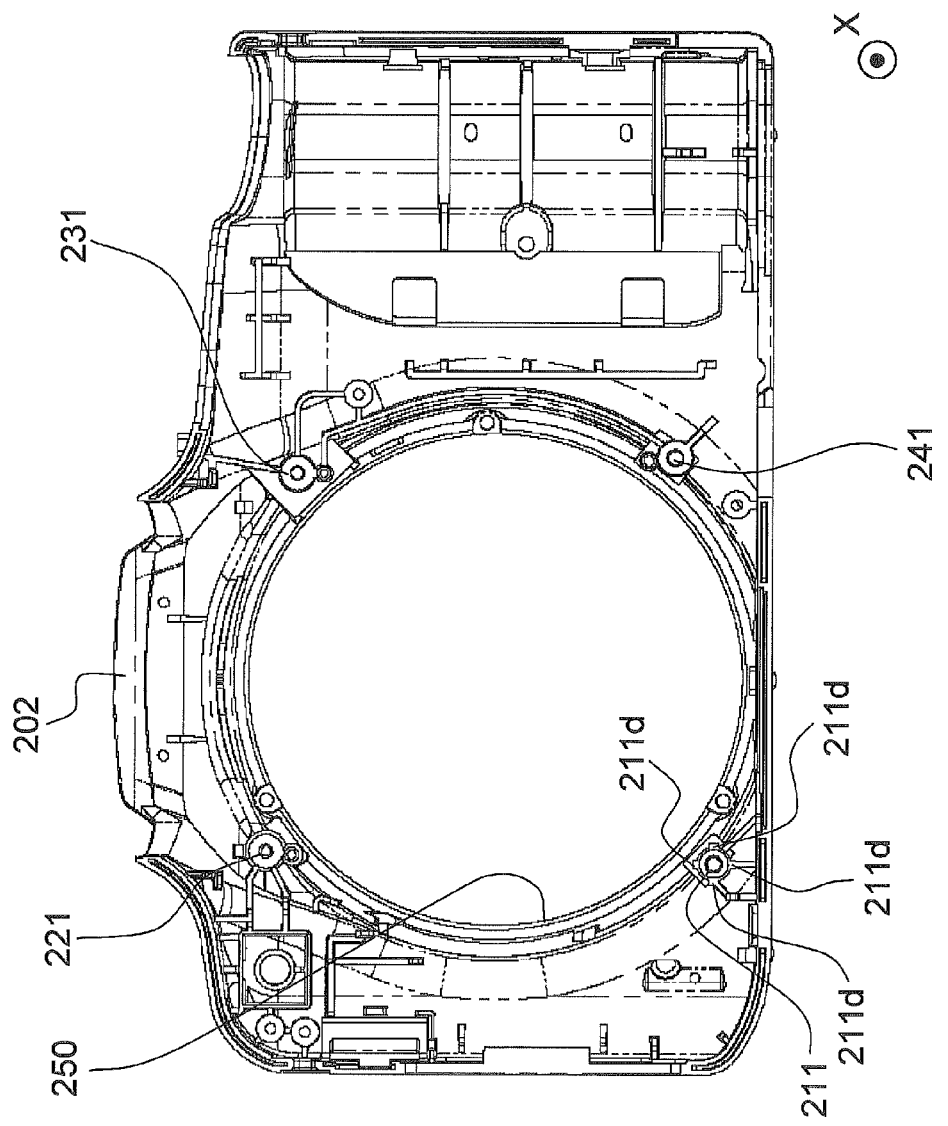
FIG. 3 is a rear view of a front panel 202.
Figure 4A:
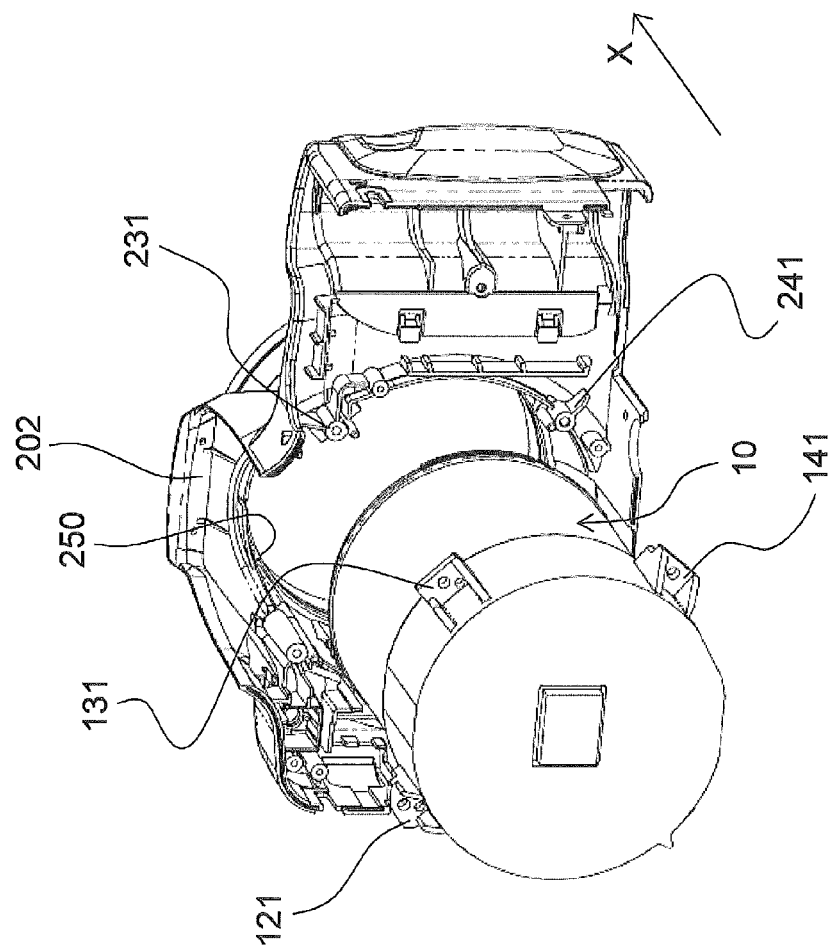
FIG. 4A is an oblique view of the attachment of the lens barrel 1 to the front panel 202.
Figure 4B:
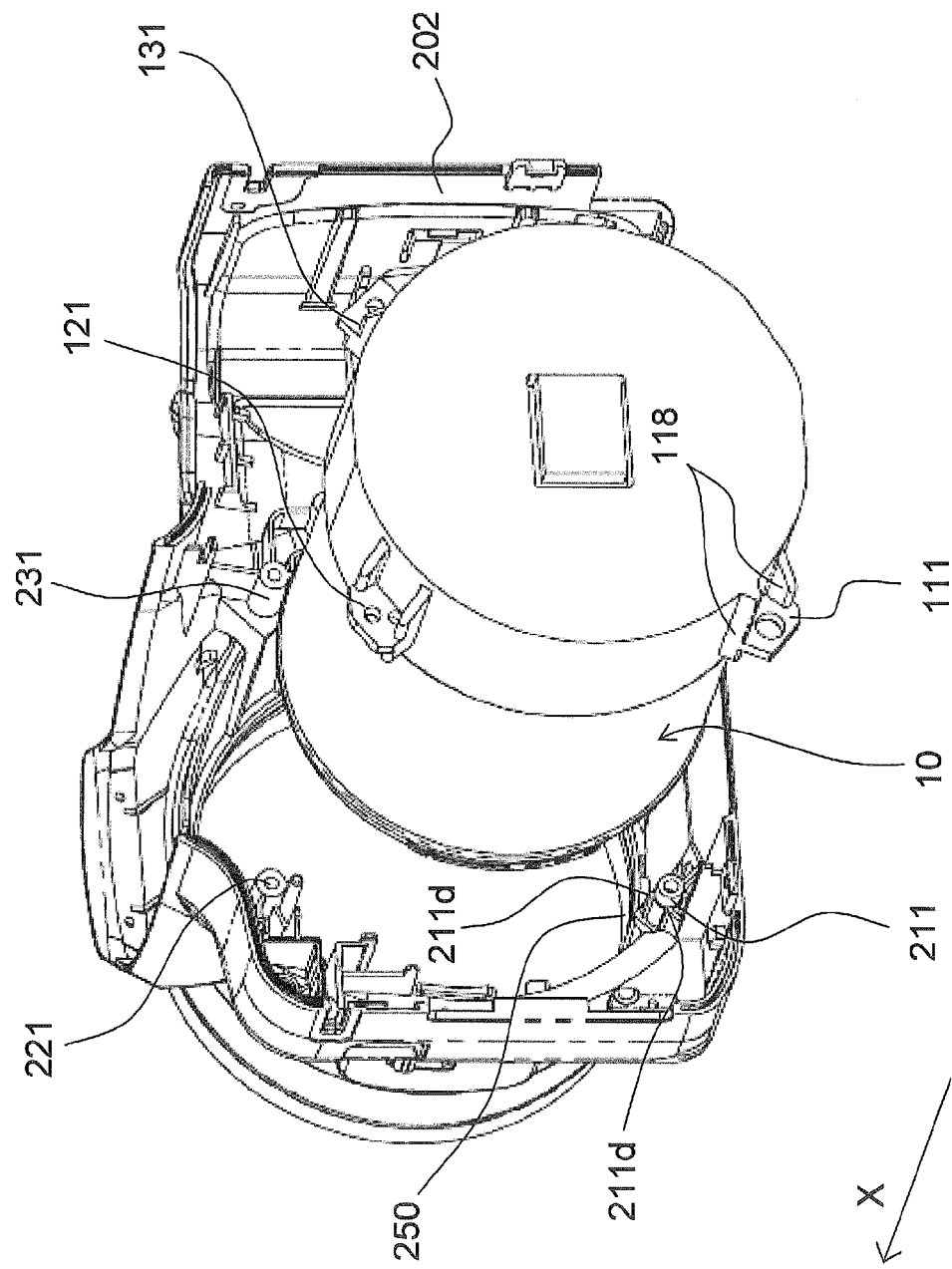
FIG. 4B is an oblique view of the attachment of the lens barrel 1 to the front panel 202.
Figure 5:
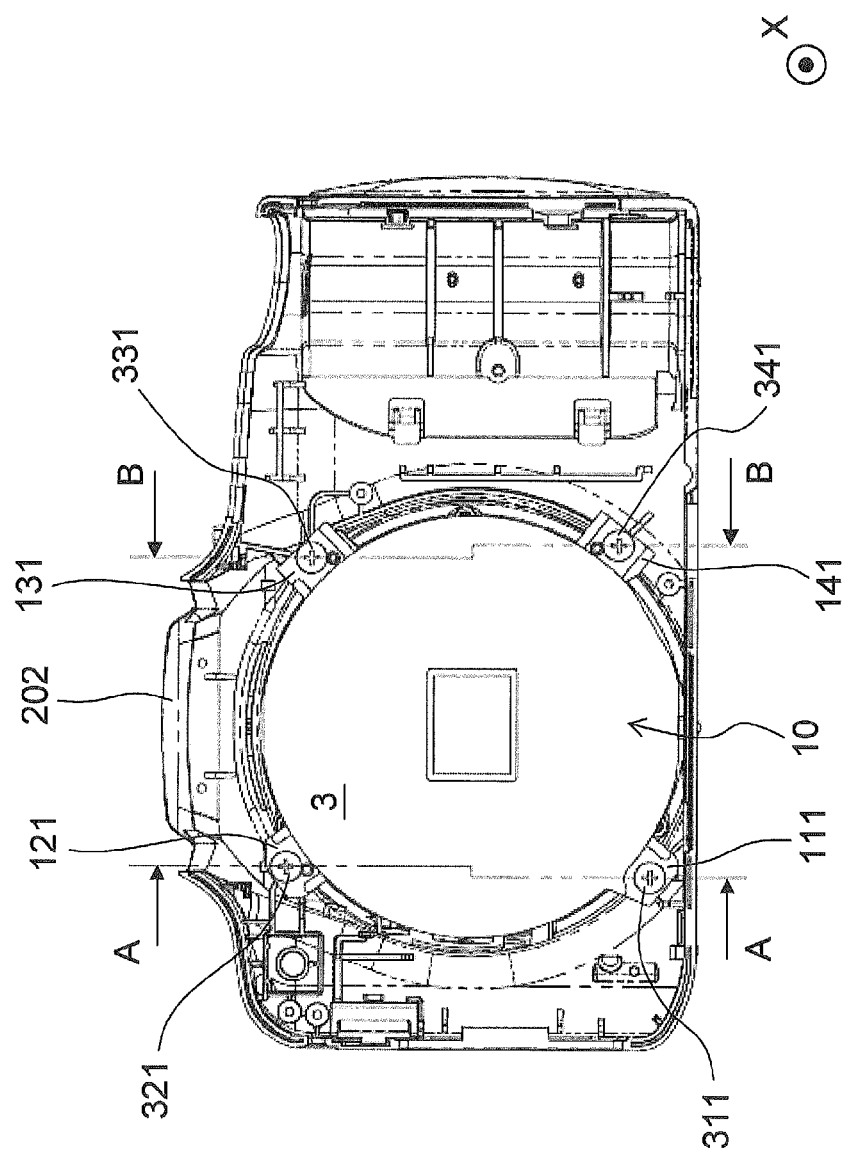
FIG. 5 is a rear view of the lens barrel 1 attached to the front panel 202.
Figure 6A:
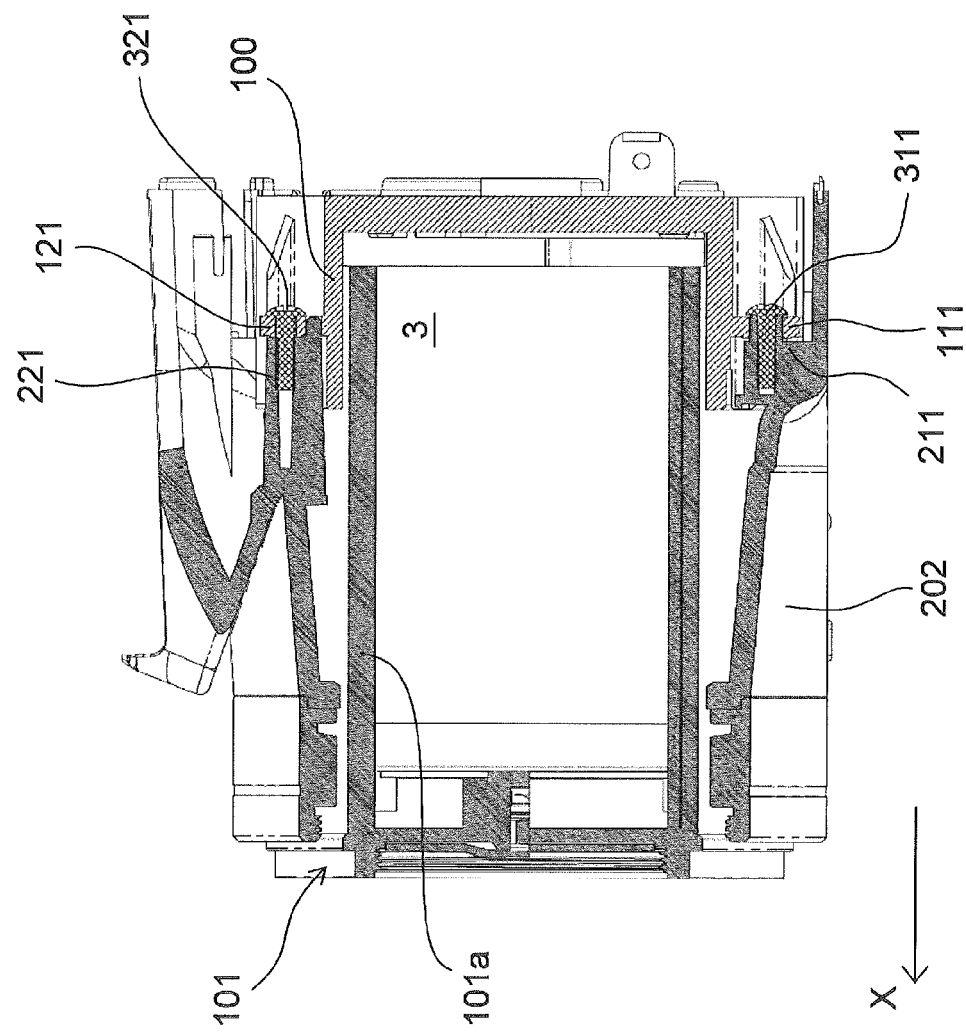
FIG. 6A is a cross section along the A-A line in FIG. 5.
Figure 6B:
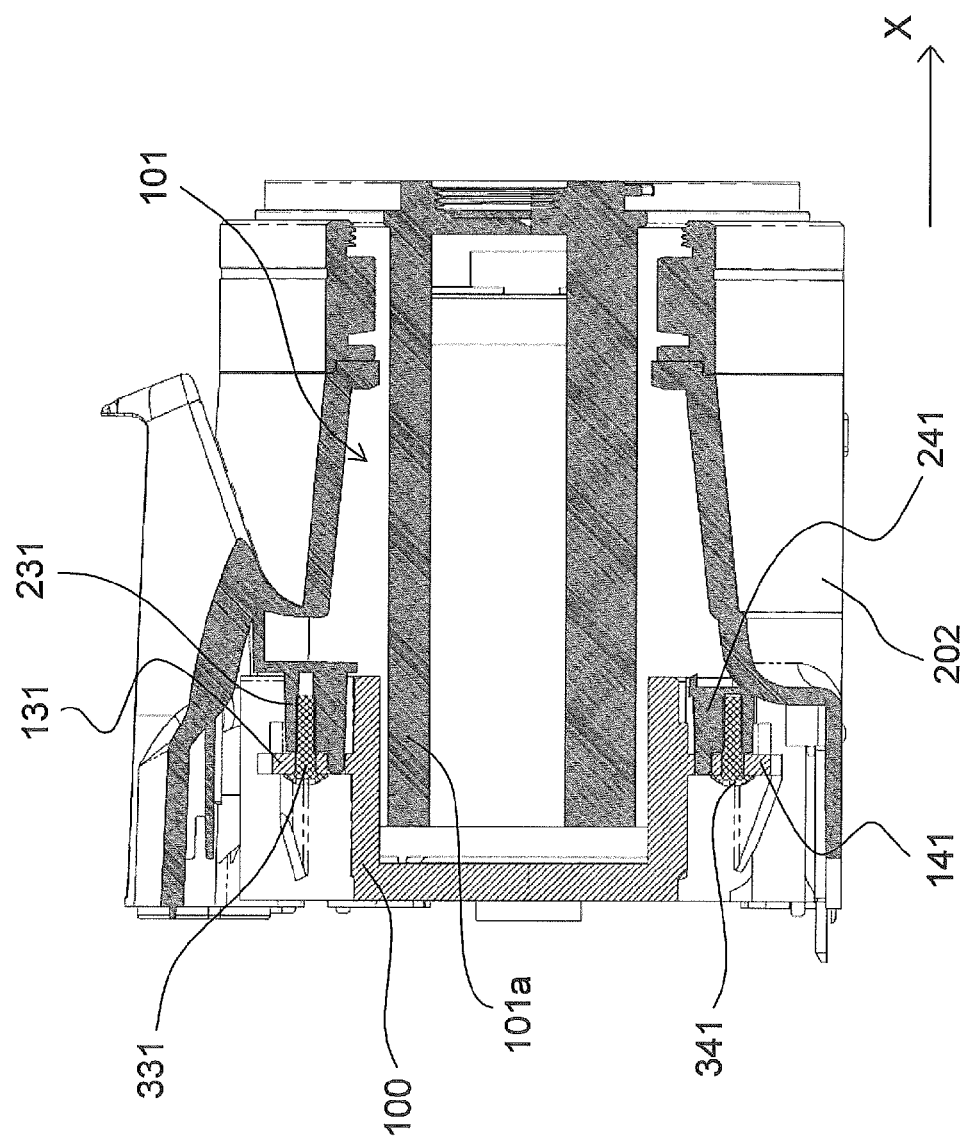
FIG. 6B is a cross section along the B-B line in FIG. 5.
Figure 6C:
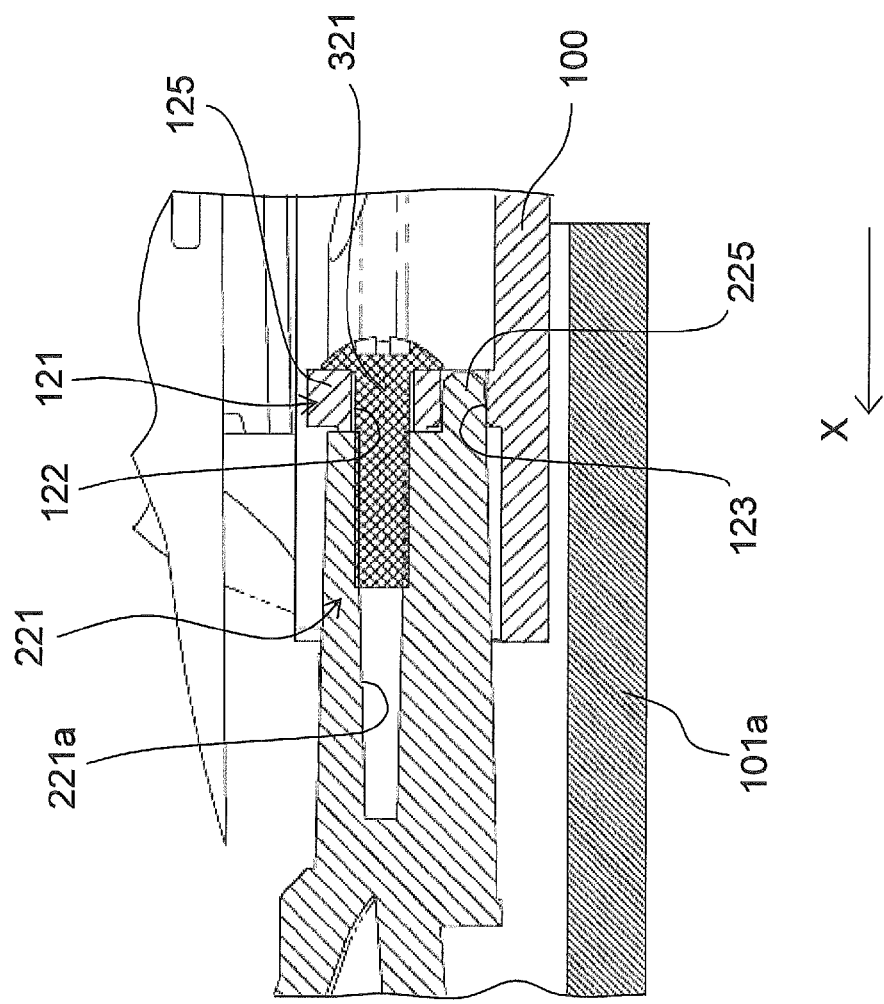
FIG. 6C is a detail view of the area around a first support portion 221 in FIG. 6A.

FIG. 1 is an oblique view of a digital camera 2 (an example of an optical device) in the first embodiment. In this embodiment, an optical device is described by using the digital camera 2 as an example, but the optical device can be a silver halide camera, a digital camera (electronic camera), a video camera, or any of various other such optical devices. FIGS. 2A and 2B are oblique views of the configuration of the lens barrel 1. FIG. 2C is a rear view of the configuration of the lens barrel 1. FIG. 3 is a rear view of the configuration of a front panel 202 according to the first embodiment. FIGS. 4A and 4B are oblique views of the state prior to the attachment of the lens barrel 1 to the front panel 202. FIG. 5 is a rear view of the lens barrel 1 attached to the front panel 202. FIGS. 6A and 6B are cross sections of the lens barrel 1 attached to the front panel 202. FIGS. 6C, 6D, 6E, and 6F are detail cross sections of the lens barrel 1 attached to the front panel 202.

The digital camera 2 has a main body 200 and the lens barrel 1. The digital camera 2 has a support structure 3 for supporting the lens barrel 1. The support structure 3 of the lens barrel has a lens barrel 10 and the front panel 202. The lens barrel 10 and the front panel 202 will be discussed below.

The lens barrel 1 is an example of a means for supporting a lens group, and is mounted in a silver halide camera, a digital camera (electronic camera), a video camera, or any of various other such optical devices.

1-2. Configuration of Lens Barrel 1

The lens barrel 1 has the lens barrel 10 and a lens group 102 (an example of an optical system). The lens group 102 has one or more lenses, and forms an optical image of a subject. The lens group 102 also has an optical axis AX. The lens barrel 10 has a body frame 101, a first attachment portion 121, a second attachment portion 131, a third attachment portion 141, and a receiver 111.

In the following description, the X-axis is set up as shown in FIG. 1. The X-axis is an axis parallel to the optical axis AX of the lens group 102. That is, the direction parallel to the optical axis AX of the lens group 102 is the X-axis direction (an example of a first direction) of the lens barrel 1. Similarly, the X-axis direction in a state in which the lens barrel 1 is attached to the main body 200 is set to the X-axis direction of the digital camera 2 and the main body 200. Also, the direction facing the subject from the digital camera 2 is set to the X-axis positive direction.

The body frame 101 is a substantially cylindrical member for supporting the lens group 102. The body frame 101 accommodates the lens group 102. As shown in FIG. 2A, the body frame 101 has a long cylinder portion 101a and a fixing frame 100. The long cylindrical segment 101a is a cylindrical member, which has an opening for bringing in incident light from the subject. The long cylindrical segment 101a accommodates the lens group 102. The fixing frame 100 is a cylindrical member that is shorter than the long cylindrical segment 101a, and is disposed substantially coaxially with the long cylindrical segment 101a, on the outer peripheral side of the long cylindrical segment 101a (FIG. 6A). As shown in FIG. 2B, the fixing frame 100 has a bottom fixed on the X-axis negative side. The first attachment portion 121, the second attachment portion 131, the third attachment portion 141, and the receiver 111 are arranged to the outer side surface of the fixing frame 100.

The first attachment portion 121, the second attachment portion 131, and the third attachment portion 141 are arranged integrally with the body frame 101 and can be respectively fixed to a first support portion 221 (discussed below), a second support portion 231 (discussed below), and a third support portion 241 (discussed below), which are arranged to the main body 200. The first attachment portion 121, the second attachment portion 131, and the third attachment portion 141 are portions for fixing the lens barrel 1 (and more precisely, the fixing frame 100) to the main body 200.

The first attachment portion 121 has a first flange 125 that protrudes from the outer side surface of the fixing frame 100. The first flange 125 is a substantially rectangular thin plate whose main face is substantially perpendicular to the X-axis direction, and is formed integrally with the fixing frame 100. A first through-hole 122 that goes through in the X-axis direction and is used for inserting a first screw 321 is formed in the approximate center of the first flange 125. Further, a first positioning hole 123 into which a first positioning projection 225 (discussed below) can be inserted is formed in the first flange 125. In attaching the lens barrel 1 to the main body 200, the first attachment portion 121 is fixed by the first screw 321 (an example of fastening member) to the first support portion 221.

The second attachment portion 131 and the third attachment portion 141 have substantially the same configuration as the first attachment portion 121. Specifically, the second attachment portion 131 has a second flange 135 that protrudes from the outer side surface of the fixing frame 100. The second flange 135 is a substantially rectangular thin plate whose main face is substantially perpendicular to the X-axis direction, and is formed integrally with the fixing frame 100. A second through-hole 132 that goes through the second flange 135 in the X-axis direction and is used for inserting a second screw 331 is formed in the approximate center of the second flange 135. Further, a second positioning hole 133 into which a second positioning projection 235 (discussed below) can be inserted is formed in the second flange 135. In attaching the lens barrel 1 to the main body 200, the second attachment portion 131 is fixed by the second screw 331 to the second support portion 231. Also, the third attachment portion 141 has a third flange 145 that protrudes from the outer side surface of the fixing frame 100. The third flange 145 is a substantially rectangular thin plate whose main face is substantially perpendicular to the X-axis direction, and is formed integrally with the fixing frame 100. A third through-hole 142 that goes through the third flange 145 in the X-axis direction and is used for inserting a third screw 341 is formed in the approximate center of the third flange 145. Further, a third positioning hole 143 into which a third positioning projection 245 (discussed below) can be inserted is formed in the third flange 145. In attaching the lens barrel 1 to the main body 200, the third attachment portion 141 is fixed by the third screw 341 to the third support portion 241.

The receiver 111 is disposed so that it can come into contact with a stopper 211 (discussed below), and is disposed with a gap left between itself and the stopper 211 in the X-axis direction. More specifically, the receiver 111 has a fourth flange 115 that protrudes from the outer side surface of the fixing frame 100, and a reinforcing part 118. The fourth flange 115 (an example of a projection) is a substantially rectangular thin plate whose main face is substantially perpendicular to the X-axis direction, and is formed integrally with the fixing frame 100. A fourth through-hole 112 (an example of a through-hole) is formed in the approximate center of the fourth flange 115. In this embodiment, the diameter of the fourth through-hole 112 is greater than the diameters of the first through-hole 122, the second through-hole 132, and the third through-hole 142. In a state in which the lens barrel 1 is attached to the main body 200, a protrusion 211b (discussed below) of the stopper 211 is fitted into the fourth through-hole 112 with a gap 111c left in the radial direction. Further, the fourth flange 115 is fitted into the stopper 211 with a gap 111a and a gap 111b left in the X-axis direction. The relation between the receiver 111 and the stopper 211 will be described in detail below. The reinforcing part 118 is linked to the fourth flange 115 and the outer side surface of the fixing frame 100, and ensures that the fourth flange 115 is strong enough.

As shown in FIG. 2C, the first attachment portion 121, the second attachment portion 131, the third attachment portion 141, and the receiver 111 are disposed on the inside of a square SQ (an example of a rectangular line) that circumscribes the outer edge E of the body frame 101 in a plane perpendicular to the X-axis. In FIG. 2C, the square SQ that circumscribes the outer edge E of the body frame 101 (more precisely, the fixing frame 100) is indicated by a two-dot chain line. In this embodiment, the first attachment portion 121, the second attachment portion 131, the third attachment portion 141, and the receiver 111 are arranged within a plane that is perpendicular to the X-axis. In other words, the positions of the first attachment portion 121, the second attachment portion 131, the third attachment portion 141, and the receiver 111 substantially coincide in the X-axis direction. The positions in the X-axis direction use as a reference, for example, the positions of the ends of the first flange 125, the second flange 135, the third flange 145, and the fourth flange 115 on the X-axis positive side. Also, the first attachment portion 121, the second attachment portion 131, the third attachment portion 141, and the receiver 111 are disposed at a substantially constant pitch around the outer periphery of the fixing frame 100. In other words, the first attachment portion 121, the second attachment portion 131, the third attachment portion 141, and the receiver 111 are disposed with a substantially constant spacing in the circumferential direction of the body frame 101, and are disposed at locations corresponding to mutually different apexes of the square SQ. Therefore, in this embodiment, the first attachment portion 121, the second attachment portion 131, the third attachment portion 141, and the receiver 111 are disposed at a spacing of about 90 degrees in the circumferential direction of the body frame 101.

Here, the outer edge E of the body frame 101 in a plane perpendicular to the X-axis direction refers to the portion where the outer side surface of the body frame 101 intersects a plane perpendicular to the X-axis direction. This "plane perpendicular to the X-axis direction" is an imaginary plane, and is a plane that bisects the first flange 125, the second flange 135, the third flange 145, and the fourth flange 115 in a direction perpendicular to the X-axis.

1-3. Configuration of Main Body 200

The main body 200 is a portion that allows the lens barrel 1 to be attached, and has the parts and functions required for capturing an image of a subject. More specifically, the main body 200 has a housing 201 that mainly includes the front panel 202, and an imaging processor (not shown) that converts an optical image of a subject formed by the lens group 102 into image data and performs image processing and the storage of image data. The imaging processor has, for example, an imaging element (not shown) that converts an optical image of a subject into an electrical signal. In this embodiment, the lens barrel 1 is fixed to the front panel 202, which is part of the housing 201 of the main body 200.

As shown in FIG. 3, the front panel 202 has an opening portion 250 into which the lens barrel 1 is inserted, the first support portion 221, the second support portion 231, the third support portion 241, and the stopper 211. As discussed above, for the sake of description, the X-axis direction when the lens barrel 1 has been attached to the main body 200 is set to the X-axis direction of the main body 200. The opening portion 250 goes through in the X-axis direction. In order to attach the lens barrel 1 to the front panel 202, the X-axis positive side of the lens barrel 1 is inserted into the opening portion 250 from the X-axis negative side of the front panel 202.

The first support portion 221, the second support portion 231, and the third support portion 241 are arranged so as to allow the first attachment portion 121, the second attachment portion 131, and the third attachment portion 141 to be fixed, respectively. The first support portion 221, the second support portion 231, and the third support portion 241 are disposed around the opening portion 250, and are formed integrally on the X-axis negative side of the front panel 202, for example. The first support portion 221 has a first positioning projection 225 and a first threaded hole 221a. The second support portion 231 has the second positioning projection 235 and a second threaded hole 231a. The third support portion 241 has the third positioning projection 245 and a third threaded hole 241a.

The first support portion 221, the second support portion 231, and the third support portion 241 are disposed at positions corresponding to the first attachment portion 121, the second attachment portion 131, and the third attachment portion 141, respectively, when the lens barrel 1 is inserted into the opening portion 250. Also, the first threaded hole 221a, the second threaded hole 231a, and the third threaded hole 241a are disposed at positions corresponding to the first through-hole 122, the second through-hole 132, and the third through-hole 142, respectively, when the lens barrel 1 is inserted into the opening portion 250. The first positioning projection 225, the second positioning projection 235, and the third positioning projection 245 are projections for temporarily stopping the lens barrel 1 at the front panel 202. In a state in which the lens barrel 1 has been attached to the front panel 202, the first positioning projection 225, the second positioning projection 235, and the third positioning projection 245 are fitted into the first positioning hole 123, the second positioning hole 133, and the third positioning hole 143, respectively.

The first screw 321, the second screw 331, and the third screw 341 are screwed into the first threaded hole 221a, the second threaded hole 231a, and the third threaded hole 241a, respectively. At this point, the first screw 321, the second screw 331, and the third screw 341 go through the first through-hole 122, the second through-hole 132, and the third through-hole 142, respectively, and the first flange 125, the second flange 135, and the third flange 145 are fixed to the first support portion 221, the second support portion 231, and the third support portion 241, respectively.

The stopper 211 is disposed with a gap left between itself and the receiver 111, and is disposed so that it can come into contact with the receiver 111. The stopper 211 is disposed around the opening portion 250, and is disposed at a position corresponding to the receiver 111 when the lens barrel 1 is inserted into the opening portion 250. The stopper 211 has a fourth threaded hole 211a, the protrusion 211b (an example of a third limiter), a base portion 211c (an example of a first limiter), and a fourth screw 311.

The base portion 211c is a portion that limits displacement of the fourth flange 115 in the X-axis direction, and is formed integrally on the X-axis negative side of the front panel 202, for example. More specifically, a planar first contact part 211d that comes into contact with the fourth flange 115 is formed on the X-axis negative side of the base portion 211c. In a state in which the lens barrel 1 has been attached to the front panel 202, the first contact portion 211d faces the fourth flange 115 in the X-axis direction.

Figure 6D:
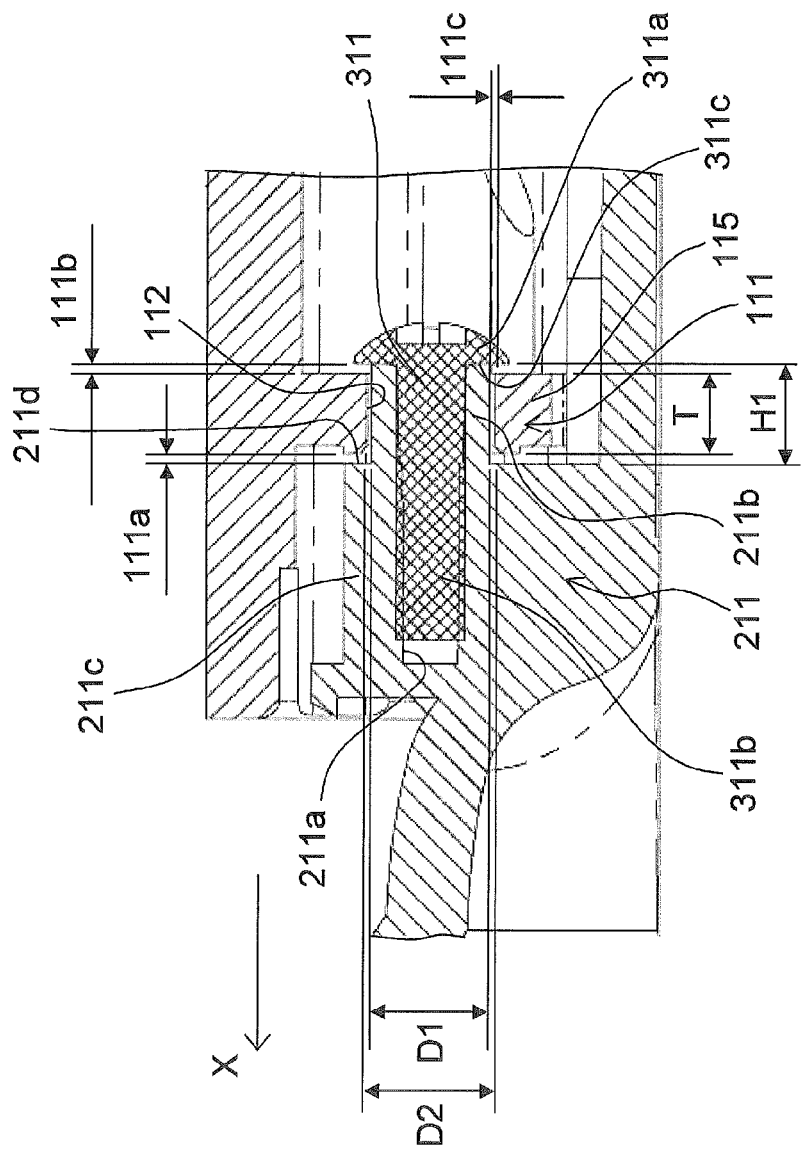
FIG. 6D is a detail view of the area around a stopper 211 in FIG. 6A.
Figure 6E:
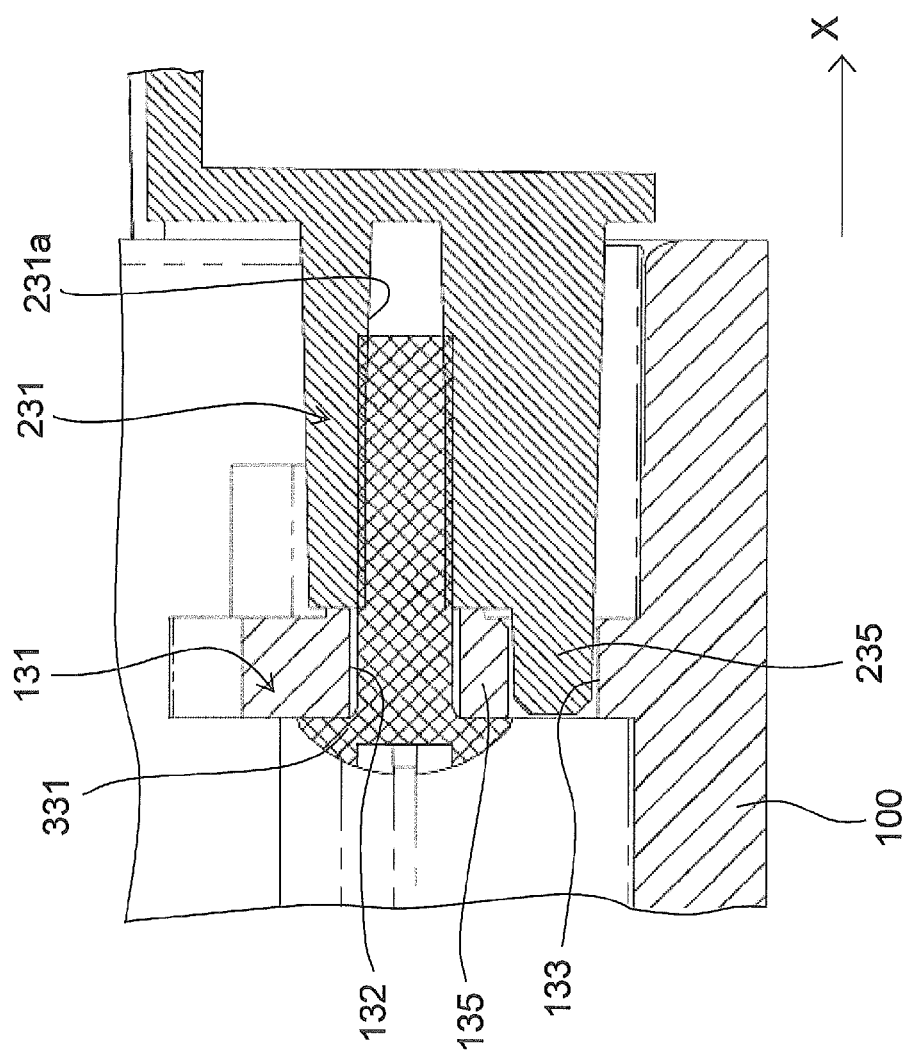
FIG. 6E is a detail view of the area around a second support portion 231 in FIG. 6B.
Figure 6F:
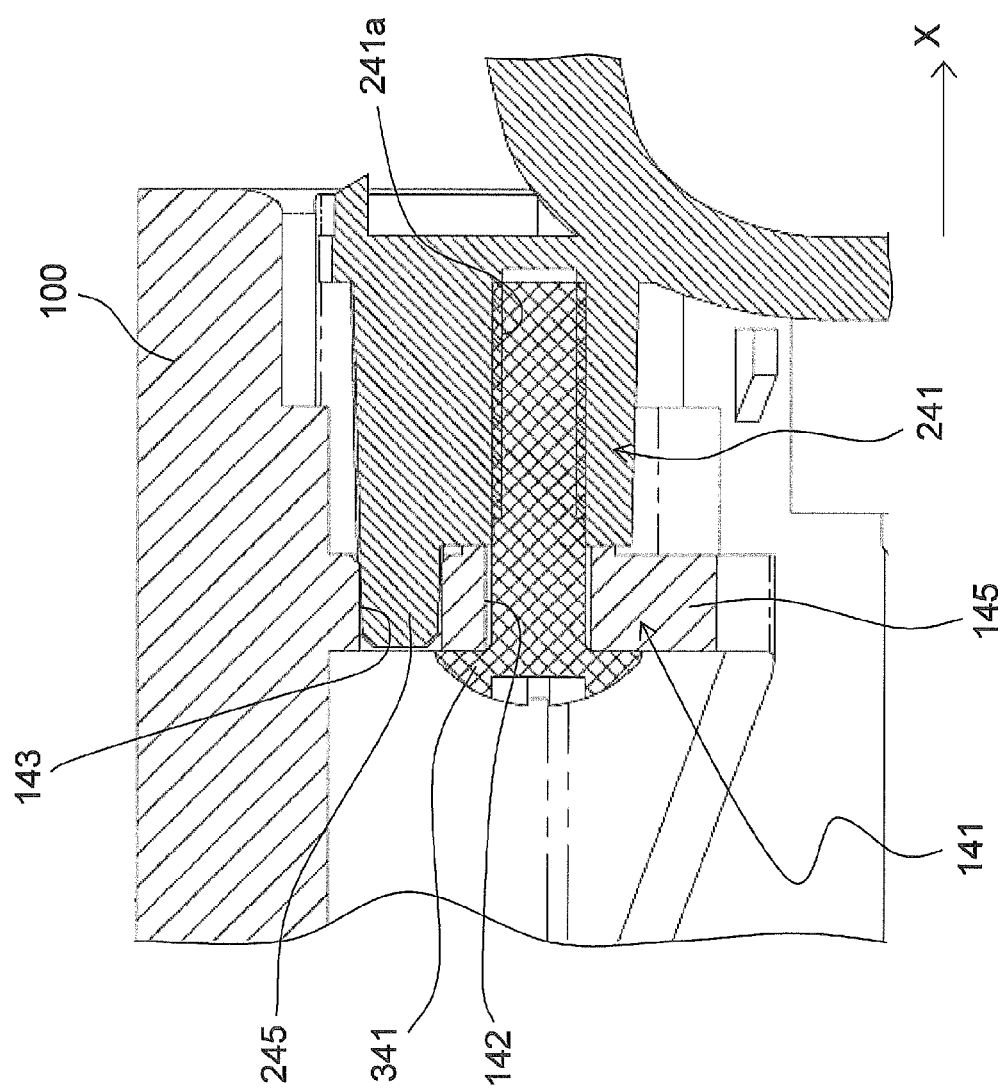
FIG. 6F is a detail view of the area around a third support portion 241 in FIG. 6B.

The protrusion 211b is a portion that limits displacement of the receiver 111, and protrudes in the X-axis negative direction from the base portion 211c. In this embodiment, the protrusion 211b is formed integrally with the base portion 211c. Thus, the protrusion 211b is arranged so as to protrude in the X-axis direction at the position of the stopper 211 corresponding to the fourth through-hole 112. In a state in which the lens barrel 1 is attached to the front panel 202, part of the protrusion 211b is accommodated in the fourth through-hole 112 with a gap left. The fourth threaded hole 211a is arranged in the center of the protrusion 211b. As shown in FIG. 6D, the height H1 of the protrusion 211b in the X-axis direction (an example of a first dimension) is slightly greater than the thickness T of the fourth flange 115 in the X-axis direction (an example of a second dimension). Also, the outside diameter D1 of the protrusion 211b is smaller than the inside diameter D2 of the fourth through-hole 112 of the receiver 111.

The fourth threaded hole 211a is a hole that extends in the X-axis direction, and is formed in the protrusion 211b and the base portion 211c. The fourth screw 311 is inserted into the fourth threaded hole 211a from the opposite side of the protrusion 211b with respect to the base portion 211c, and is fixed to the fourth threaded hole 211a. The fourth screw 311 has a second head 311a (an example of a second limiter) and a shaft part 311b that extends from the second head 311a. Threads are formed on the shaft part 311b. The second head 311a is a portion that limits displacement of the fourth flange 115 in the X-axis direction, and is disposed on the opposite side of the fourth flange 115 from the base portion 211c in a state in which the lens barrel 1 is attached to the front panel 202. A planar second contact part 311c is formed on the shaft part 311b side of the second head 311a. As discussed above, the outside diameter D1 of the protrusion 211b is set to be smaller than the inside diameter D2 of the fourth through-hole 112 of the receiver 111. Furthermore, the inside diameter of the fourth through-hole 112 is set to be smaller than the outside diameter of the second head 311a of the fourth screw 311. Therefore, in a state in which the fourth screw 311 is fixed to the fourth threaded hole 211a, part of the second contact part 311c (more precisely, the outer peripheral part) is exposed. Also, in a state in which the fourth screw 311 is fixed to the fourth threaded hole 211a, part of the second contact part 311c (more precisely, the inner peripheral part) is in contact with the end of the protrusion 211b on the opposite side from the base portion 211c. In a state in which the lens barrel 1 is attached to the front panel 202, the outer peripheral part of the second contact part 311c is facing the fourth flange 115 in the X-axis direction.

Just as with the fourth threaded hole 211a, the center axis direction of the first threaded hole 221a, the second threaded hole 231a, and the third threaded hole 241a is substantially parallel with the X-axis direction. Also, in this embodiment, the first screw 321, the second screw 331, the third screw 341, and the fourth screw 311 are all screws with the same shape and size. The outside diameter of the protrusion 211b is greater than the outside diameter of the shaft part 311b of the fourth screw 311, but the inside diameter of the fourth through-hole 112 is greater than the inside diameter of the first through-hole 122, the second through-hole 132, and the third through-hole 142, so the fourth through-hole 112 can accommodate the protrusion 211b. Thus, the first screw 321, the second screw 331, the third screw 341, and the fourth screw 311 can all share a common screw type, which prevents the use of the wrong type of screwing in attaching the lens barrel 1 to the main body 200.

1-4. Attachment of Lens Barrel 1 to Main Body 200

As shown in FIGS. 4A and 4B, in the attachment of the lens barrel 1 to the front panel 202, first the body frame 101 is inserted from the X-axis negative side into the opening portion 250, and the first attachment portion 121, the second attachment portion 131, and the third attachment portion 141 are brought into contact with the first support portion 221, the second support portion 231, and the third support portion 241, respectively. More specifically, the first positioning projection 225, the second positioning projection 235, and the third positioning projection 245 are inserted into the first positioning hole 123, the second positioning hole 133, and the third positioning hole 143, respectively. Thus temporarily stopping the lens barrel 1 at the front panel 202 allows the lens barrel 1 to be positioned with respect to the front panel 202. At this point, the protrusion 211b of the stopper 211 passes through the fourth through-hole 112 of the receiver 111 with the gap 111c left in the radial direction of the protrusion 211b (a direction perpendicular to the X-axis).

Furthermore, the fixing frame 100 is fixed to the front panel 202 in a state in which a gap is formed between the interior surface of the fourth through-hole 112 and the outer peripheral surface of the protrusion 211b. As shown in FIG. 5, the first attachment portion 121 is fixed to the first support portion 221 by the first screw 321. Similarly, the second attachment portion 131 is fixed to the second support portion 231 by the second screw 331, and the third attachment portion 141 is fixed to the third support portion 241 by the third screw 341. By thus fixing the body frame 101 to the front panel 202 at three places, there is less strain on the members when the lens barrel 1 is fixed to the main body 200, and the lens barrel 1 can be fixed more accurately to the main body 200.

Furthermore, the fourth screw 311 is fixed to the fourth threaded hole 211a of the protrusion 211b. The fourth screw 311 is screwed in until the second head 311a (more precisely, the second contact part 311c) hits the end of the protrusion 211b on the opposite side from the base portion 211c. The diameter of the second head 311a of the fourth screw 311 is greater than the diameter of the fourth through-hole 112, so even if the attachment portions (that is, the first attachment portion 121, the second attachment portion 131, and the third attachment portion 141) should happen not to be fixed to the front panel 202, the receiver 111 will not come loose from the protrusion 211b.

As mentioned above, the height H1 of the protrusion 211b in the X-axis direction is slightly greater than the thickness T of the fourth flange 115 in the X-axis direction, and the outside diameter D1 of the protrusion 211b is smaller than the inside diameter D2 of the fourth through-hole 112. Accordingly, as shown in FIG. 6D, a gap is ensured between the receiver 111 and the stopper 211. In other words, the receiver 111 is disposed with a gap left between itself and the stopper 211. More precisely, the gap 111a is maintained between the base portion 211c and the fourth flange 115 in the X-axis direction. Also, the gap 111b is maintained between the receiver 111 and the second head 311a of the fourth screw 311 in the X-axis direction. Further, the gap 111c is maintained between the outer peripheral surface of the fourth threaded hole 211a and the interior surface of the fourth through-hole 112 in the radial direction of the protrusion 211b.

The dimensions of the members are set so as to ensure the gap 111a, the gap 111b, and the gap 111c. For example, the members are designed by taking into account the error that can occur in the dimensions of the members during their manufacturing (molding). That is, error in the dimensions of the members can cause the sizes of the gap 111a, the gap 111b, and the gap 111c to fluctuate, so the dimensions of the members and the sizes of the gaps are designed to reliably ensure the various gaps when the first attachment portion 121, the second attachment portion 131, and the third attachment portion 141 have been fixed to the front panel 202. Also, the sizes of the gaps are designed by taking into account the materials and sizes of the members. More specifically, the sizes of the gap 111a, the gap 111b, and the gap 111c are designed by taking into account the degree of elastic deformation that will occur in the members of the lens barrel 1 and the main body 200 when the lens barrel 1 is subjected to external force.

Thus, the receiver 111 is disposed in a state in which the gap 111a, the gap 111b, and the gap 111c are ensured in specific amounts between the receiver 111 and the stopper 211 (that is, in a state in which there is play between the receiver 111 and the stopper 211), and in the resulting state, the fourth threaded hole 211a goes through the fourth through-hole 112 with a gap in between them. Therefore, since the receiver 111 and the stopper 211 do not participate in fixing the lens barrel 1 to the main body 200 during normal use, the lens barrel 1 is fixed to the main body 200 at only three places, as discussed above. More specifically, during normal use the lens barrel 1 is supported by the first support portion 221, the second support portion 231, and the third support portion 241. As a result, there is less strain on the members than when the lens barrel 1 is fixed to the main body 200 at four or more places, and this facilitates positioning when the lens barrel 1 is fixed and ensuring good positional accuracy in a fixed state. The "during normal use" referred to here means a state in which no force caused by impact or the like is being exerted on the lens barrel 1.

Meanwhile, there may be situations when an impact or other force is exerted on the lens barrel 1. For example, let us consider a case in which an impact force is exerted in the X-axis negative direction on the lens barrel 1 protruding from the opening portion 250 of the main body 200 (that is, if a force attempts to push the lens barrel 1 into the main body 200). At this point, the members that form the connection portion between the lens barrel 1 and the main body 200, such as the first attachment portion 121, the second attachment portion 131, and the third attachment portion 141, as well as the first support portion 221, the second support portion 231, and the third support portion 241, undergo elastic deformation. As a result, the receiver 111 is displaced more to the X-axis negative side than its position during normal use with respect to the stopper 211, which eliminates the gap 111b and causes the receiver 111 to hit the fourth screw 311. More precisely, the fourth flange 115 hits the second contact part 311c of the second head 311a. Also, when elastic deformation causes the receiver 111 to be displaced in a direction perpendicular to the X-axis direction, the interior surface of the fourth through-hole 112 hits the outer side surface of the protrusion 211b. When the members are thus displaced within the range of elastic deformation, the receiver 111 can hit the stopper 211 (more specifically, the base portion 211c, the protrusion 211b, and/or the second head 311a). As a result, impact force exerted on the lens barrel 1 is also dispersed to the stopper 211, rather than just to the first support portion 221, the second support portion 231, and the third support portion 241. Thus, the impact force exerted on the lens barrel 1 is dispersed to four places and absorbed. When the impact force has been eliminated, the elastic strength of the members causes the lens barrel 1 to return to its original position with respect to the main body 200.

A case in which the lens barrel 1 was subjected to a force in the X-axis negative direction was described above, but the same applies when a force is exerted in another direction. For instance, when impact force is exerted on the lens barrel 1 in the X-axis positive direction, the receiver 111 is displaced by elastic deformation more to the X-axis positive side than its position during normal use with respect to the stopper 211. In this case, the receiver 111 hits the base portion 211c. More specifically, the fourth flange 115 hits the first contact part 211d. As a result, the impact force exerted on the lens barrel 1 is also dispersed to the stopper 211, rather than just to the first support portion 221, the second support portion 231, and the third support portion 241.

As discussed above, with the lens barrel support structure 3 according to this embodiment, the first attachment portion 121, the second attachment portion 131, and the third attachment portion 141 protruding from the outer side surface of the fixing frame 100 are attached by the first screw 321, the second screw 331, and the third screw 341 to the first support portion 221, the second support portion 231, and the third support portion 241 on the main body 200 side, respectively. Since the lens barrel 1 is thus attached to the main body 200 at three places, the lens barrel 1 can be stabilized. On the other hand, since the lens barrel 1 comes into contact with the main body 200 at three places, the positions where the lens barrel 1 and the main body 200 come into contact are more easily disposed within the same plane than when the contact is at four or more places. That is, by fixing the lens barrel 1 at three places, it is easier to ensure planarity. With this embodiment, ensuring planarity means that the end of the first flange 125 on the X-axis positive side, the end of the second flange 135 on the X-axis positive side, and the end of the third flange 145 on the X-axis positive side are disposed substantially tangential to the imaginary plane that is perpendicular to the X-axis.

Also, since the receiver 111 is disposed with a gap left between itself and the stopper 211, when the lens barrel 1 is not subjected to impact or another such force, there is no extra load exerted on the lens barrel 1 from the front panel 202 via the receiver 111 and the stopper 211.

Even if the digital camera 2 should be dropped on the front face (that is, the X-axis positive side) of the lens barrel 1, the load exerted on the lens barrel 1 will be dispersed through four places, namely, the first support portion 221, the second support portion 231, the third support portion 241, and the stopper 211, to the main body 200. Since it is thus possible for an external force exerted on the lens barrel 1 to be received by the entire digital camera 2, the impact that is directly transmitted into the interior of the lens barrel 1 can be cushioned, which makes it possible to reduce the likelihood of damage to the lens group 102.

Also, with the support structure 3, impact resistance can be improved while simplifying the structure. More specifically, since all that matters is that the gap 111a, the gap 111b, and the gap 111c be formed between the receiver 111 and the stopper 211, the number of parts can be reduced as compared to when an elastic member or other such cushioning member is disposed between the receiver 111 and the stopper 211. Also, since displacement of the receiver 111 in the X-axis direction is limited by the second head 311a of the fourth screw 311, the stopper 211 can be formed merely by fixing the fourth screw 311. Therefore, no extra work is entailed in attaching the lens barrel 1 to the main body 200.

Thus, with the support structure 3 of the lens barrel 1 according to this embodiment, it is possible to prevent damage and so forth to the lens barrel 1. Furthermore, it is possible to provide an imaging device or other such optical device with which there is no strain in the layout of the lens group or the imaging element, and which is easier to assemble.

1-5. Effects

The effects of the support structure 3 of the lens barrel 1 disclosed herein are compiled below.

(1) With the support structure 3 of this lens barrel 1, the front panel 202 has the first support portion 221, the second support portion 231, the third support portion 241, and the stopper 211. Also, the lens barrel 10 has the body frame 101, the first attachment portion 121 fixed to the first support portion 221 and arranged integrally with the body frame 101, the second attachment portion 131 fixed to the second support portion 231 and arranged integrally with the body frame 101, the third attachment portion 141 fixed to the third support portion 241 and arranged integrally with the body frame 101, and the receiver 111 arranged integrally with the body frame 101 and disposed so as to be able to come into contact with the stopper 211 and disposed with a gap left between itself and the stopper 211 in the X-axis direction.

Therefore, since the lens barrel 10 is fixed to the front panel 202 at three places by the first attachment portion 121, the second attachment portion 131, and the third attachment portion 141, less strain is produced in the members during attachment of the lens barrel 10 to the front panel 202 than when the fixing is done at four or more places. That is, it is possible to attach the lens barrel 1 accurately to the front panel 202. Furthermore, since the receiver 111 can be disposed so as to be able to come into contact with the stopper 211 and disposed with a gap left between itself and the stopper 211, when the lens barrel 1 is subjected to an impact or other such force and undergoes elastic deformation, the stopper 211 can support the receiver 111. That is, since the lens barrel 1 is supported by the front panel 202 via the stopper 211, rather than just the first support portion 221, the second support portion 231, and the third support portion 241, any force exerted on the lens barrel 1 is more efficiently dispersed. As a result, even if the lens barrel 1 is subjected to a force, it is less likely that local load that could damage the members will be produced in the lens barrel 1 and the front panel 202. Thus, with the support structure 3 of this lens barrel 1, attachment accuracy is ensured, and impact resistance can be improved.

(2) With the support structure 3 of this lens barrel 1, the stopper 211 has the base portion 211c that limits displacement of the fourth flange 115 in the X-axis direction, and the second head 311a that is disposed on the opposite side of the fourth flange 115 from the base portion 211c and limits displacement of the flange in the X-axis direction. Since the base portion 211c and the second head 311a are thus disposed on both sides of the fourth flange 115, when the fourth flange 115 is displaced in the X-axis direction, the fourth flange 115 will be supported by the base portion 211c and the second head 311a. Thus, even if the lens barrel 1 should be subjected to a force that creates elastic deformation, the receiver 111 can be more reliably supported by the stopper 211.

Also, the fourth flange 115 of the receiver 111 has the fourth through-hole 112. The fourth through-hole 112 goes through in the X-axis direction, accommodates part of the protrusion 211b with a gap left, and is disposed so as to be able to come into contact with the stopper 211. Therefore, when the lens barrel 1 is displaced in a direction perpendicular to the X-axis direction, the stopper 211 can support the receiver 111.

Meanwhile, since the height H1 of the protrusion 211b in the X-axis direction is greater than the thickness T of the fourth flange 115 in the X-axis direction, a gap can be reliably formed between the fourth flange 115 and the stopper 211 in the X-axis direction.

(3) With the support structure 3 of this lens barrel 1, the protrusion 211b is formed integrally with the base portion 211c and protrudes in the X-axis direction from the base portion 211c, and the second head 311a is in contact with the end of the protrusion 211b on the opposite side from the base portion 211c. Therefore, the size of the space formed between the base portion 211c and the second head 311a in the X-axis direction is the height H1 of the protrusion 211b in the X-axis direction. As a result, when the lens barrel 1 is attached to the front panel 202, there is no need to adjust the position of the second head 311a with respect to the base portion 211c. That is, any extra work can be omitted in attaching the lens barrel 1.

(4) With the support structure 3 of this lens barrel 1, since the first attachment portion 121, the second attachment portion 131, the third attachment portion 141, and the receiver 111 are disposed on the inside of the square SQ that circumscribes the outer edge E of the body frame 101 in a plane perpendicular to the X-axis direction, these attachment portions and the receiver 111 are disposed near the lens barrel 10. Therefore, plenty of space can be ensured around the lens barrel 1 for disposing other members. Furthermore, since the receiver 111 is arranged at one place on the body frame 101, the first attachment portion 121, the second attachment portion 131, the third attachment portion 141, and the receiver 111 can be more efficiently disposed around the lens barrel 1. As a result, the digital camera 2 can be more compact, and greater latitude is afforded in design.

Since the first attachment portion 121, the second attachment portion 131, the third attachment portion 141, and the receiver 111 are disposed at positions corresponding to the different apexes of the square SQ, the first attachment portion 121, the second attachment portion 131, the third attachment portion 141, and the receiver 111 can be disposed with spaces left between then. As a result, any force exerted on the lens barrel 1 will be efficiently dispersed, so impact resistance can be improved. Also, since the first attachment portion 121, the second attachment portion 131, and the third attachment portion 141 are disposed with spaces between them, the lens barrel 1 can be fixed to the front panel 202 in a more stable state.

Second Embodiment

Figure 7:
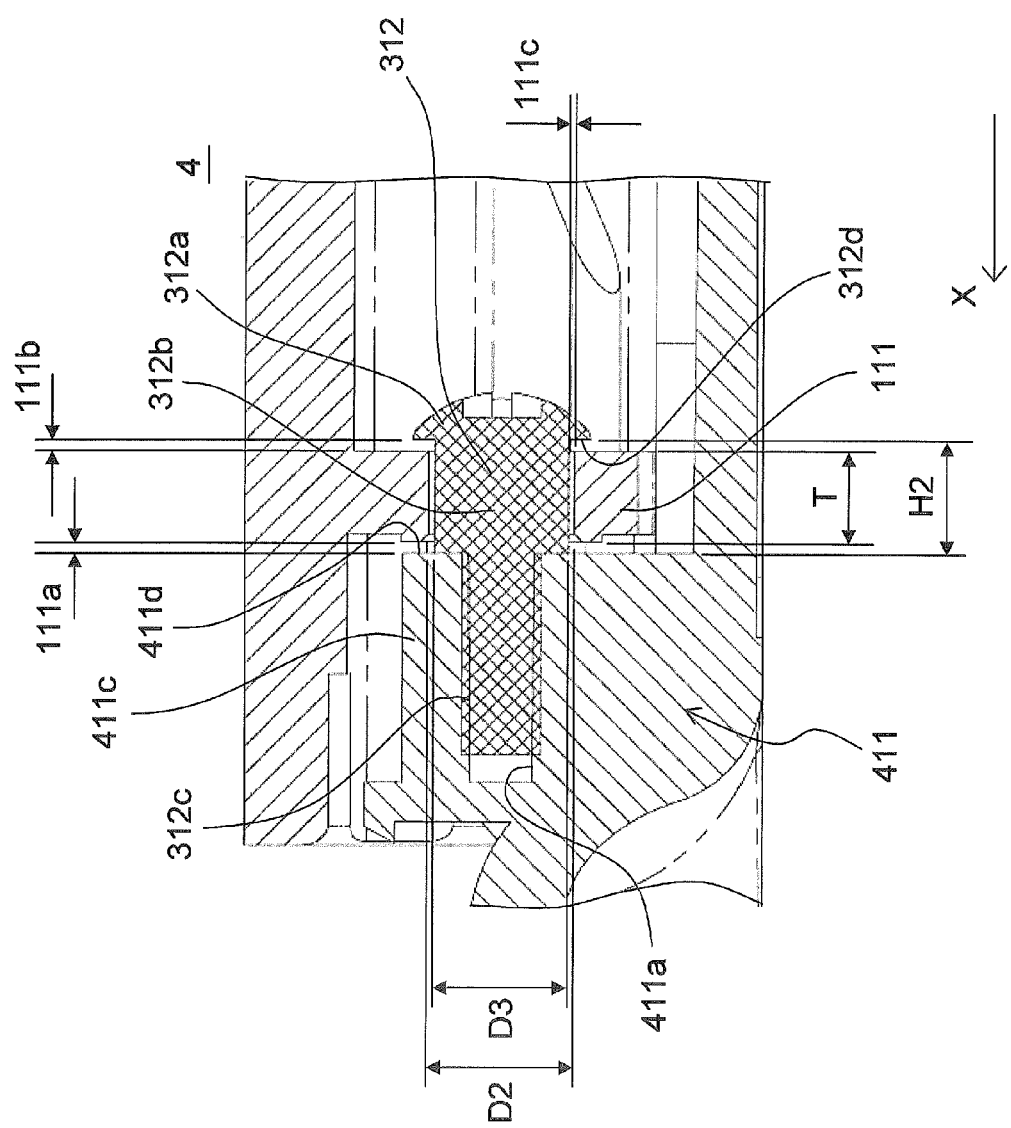
FIG. 7 is a cross section of a stopper 411 (second embodiment) corresponding to FIG. 6D.

FIG. 7 is a cross section of the main components in a lens barrel support structure 4 according to a second embodiment. Those portions having substantially the same function as in the first embodiment will be numbered the same, and redundant descriptions will be omitted. The support structure 4 according to this second embodiment is characterized by the configuration of a stopper 411. The stopper 211 according to the first embodiment had the protrusion 211b and the fourth screw 311, but the stopper 411 according to the second embodiment has a stepped screw 312.

The stopper 411 has a base portion 411c (an example of a first limiter), a fourth threaded hole 411a, and the stepped screw 312.

The stepped screw 312 has a first head 312a (an example of a second limiter), a cylindrical non-threaded part 312b (an example of a trunk part, and an example of a third limiter) extending from the first head 312a, and a cylindrical threaded part 312c extending from the non-threaded part 312b. The diameter of the non-threaded part 312b is greater than the diameter of the threaded part 312c. Also, the diameter of the first head 312a is greater than the diameter of the non-threaded part 312b. The first head 312a, the non-threaded part 312b, and the threaded part 312c are formed integrally. The first head 312a is a portion that limits displacement of the fourth flange 115 in the X-axis direction, and is disposed on the opposite side of the fourth flange 115 from the base portion 411c in a state in which the lens barrel 1 is attached to the front panel 202. More specifically, a planar second contact part 312d is formed on the non-threaded part 312b side of the first head 312a. In a state in which the lens barrel 1 is attached to the front panel 202, the second contact part 312d faces the fourth flange 115 in the X-axis direction. Threads are formed in the threaded part 312c.

The base portion 411c limits displacement of the fourth flange 115 in the X-axis direction. More specifically, a planar first contact part 411d for coming into contact with the fourth flange 115 is formed on the X-axis negative side of the base portion 411c. In a state in which the lens barrel 1 is attached to the front panel 202, the first contact part 411d faces the fourth flange 115 in the X-axis direction. The fourth threaded hole 411a is a portion for mating with the threaded part 312c of the stepped screw 312, and is formed in the base portion 411c. The fourth threaded hole 411a is a hole extending along the X-axis direction, and in which the threaded part 312c is fixed. The threaded part 312c is inserted from the X-axis negative side of the base portion 411c into the fourth threaded hole 411a.

The fourth flange 115 is equipped with a fourth through-hole 112 that goes through in the X-axis direction and is able to accommodate part of the non-threaded part 312b of the stepped screw 312 with a gap left. The height H2 of the non-threaded part 312b in the X-axis direction is slightly greater than the thickness T of the fourth flange 115 in the X-axis direction, and the outside diameter D3 of the non-threaded part 312b is smaller than the inside diameter D2 of the fourth through-hole 112. Accordingly, as shown in FIG. 7, a gap is ensured between the receiver 111 and the stopper 411. In other words, the receiver 111 is disposed with a gap between itself and the stopper 411. More precisely, the gap 111a is maintained between the base portion 411c and the fourth flange 115 in the X-axis direction. Also, the gap 111b is maintained between the fourth flange 115 and the first head 312a of the stepped screw 312 in the X-axis direction. Furthermore, the gap 111c is maintained between the outer side surface of the non-threaded part 312b and the interior surface of the fourth through-hole 112 in the radial direction of the non-threaded part 312b. Thus, when the lens barrel 1 has been attached to the main body 200, there is play between the receiver 111 and the stopper 411. Therefore, during normal use, the receiver 111 and the stopper 411 do not participate in fixing the lens barrel 1 to the main body 200, so the lens barrel 1 is fixed to the main body 200 at three places just as in the first embodiment. As a result, it is easier to ensure positional accuracy in positioning during the fixing of the lens barrel 1 to the main body 200, and in a state in which the lens barrel 1 has been fixed.

Just as in the first embodiment, impact resistance can be improved with the support structure 4 according to the second embodiment. For example, we can imagine a case in which the lens barrel 1, which protrudes from the opening portion 250 of the main body 200, is subjected to impact force in the X-axis negative direction. Since the lens barrel 1 at this point is displaced in the X-axis negative direction by elastic deformation, the fourth flange 115 hits the first head 312a of the stepped screw 312 (more precisely, the second contact part 312d). Also, when the receiver 111 is displaced in a direction perpendicular to the X-axis direction by elastic deformation, the interior surface of the fourth through-hole 112 hits the outer side surface of the non-threaded part 312b of the stepped screw 312. Meanwhile, when the lens barrel 1 is subjected to impact force in the X-axis positive direction, the receiver 111 is displaced in the X-axis positive direction by elastic deformation, so the receiver 111 hits the base portion 411c (more precisely, the first contact part 411d). When the members are thus displaced within the range of elastic deformation, the receiver 111 hits the base portion 411c (more precisely, the base portion 411c, the non-threaded part 312b, and/or the first head 312a of the stepped screw 312). As a result, the impact force to which the lens barrel 1 is subjected is also dispersed to the stopper 411, rather than just to the first support portion 221, the second support portion 231, and the third support portion 241. Since the impact force to which the lens barrel 1 is subjected is thus dispersed and absorbed at four places, the impact resistance of the lens barrel 1 and the main body 200 can be improved over that when the lens barrel 1 is supported at just three places.

As discussed above, with the support structure 4, the non-threaded part 312b is formed integrally with the first head 312a, and the base portion 411c is in contact with the end of the non-threaded part 312b on the opposite side from the first head 312a. Therefore, the size of the space formed between the base portion 411c and the first head 312a in the X-axis direction is the height H2 of the non-threaded part 312b in the X-axis direction. Therefore, when the lens barrel 1 is attached to the front panel 202, there is no need to adjust the position of the first head 312a with respect to the base portion 411c. That is, no extra work is entailed in attaching the lens barrel 1.

Other Embodiments

Embodiments of the present invention are not limited to those given above, and various changes and modifications are possible without departing from the gist of the invention.

(1) In the above embodiment, a configuration was described in which there was the receiver 111 at one location and the attachment portions (namely, the first attachment portion 121, the second attachment portion 131, and the third attachment portion 141) at three locations fixed by screws, but the receiver 111 may be arranged at two or more locations of the body frame 101.

(2) In the above embodiment, the first attachment portion 121, the second attachment portion 131, the third attachment portion 141, and the receiver 111 were arranged in substantially the same plane perpendicular to the X-axis direction, but these do not necessarily have to be disposed in the same plane, and their position may be offset in the X-axis direction to the extent that the lens barrel 1 can still be accurately attached to the main body 200. Also, in the above embodiment, the first attachment portion 121, the second attachment portion 131, the third attachment portion 141, and the receiver 111 were arranged at a substantially constant pitch around the fixing frame 100, but the pitch does not necessarily have to be constant, and may be varied to the extent that the lens barrel 1 can still be accurately fixed to the fixing frame 100 and the stability of the lens barrel 1 can be ensured.

Also, the first attachment portion 121, the second attachment portion 131, the third attachment portion 141, and the receiver 111 may be separate members from the fixing frame 100. For example, the receiver 111 may be formed as a different member from the body frame 101, and fixed to the fixing frame 100. Thus, the phrase that the first attachment portion 121, the second attachment portion 131, the third attachment portion 141, and the receiver 111 "are arranged integrally with the fixing frame 100" is a concept that encompasses not only a case in which they are formed integrally with the fixing frame 100, but also a case in which they are fixed to the fixing frame 100.

Also, the first attachment portion 121, the second attachment portion 131, and the third attachment portion 141 were fixed to the front panel 202 by the first screw 321, the second screw 331, and the third screw 341, but these attachment portions may be fixed to the front panel 202 by some means other than screws, such as adhesive bonding or riveting.

Also, the same type of screw was used for all of the first screw 321, the second screw 331, the third screw 341, and the fourth screw 311, but these screws may instead have mutually different shapes and sizes.

(3) In the above embodiment, a lens barrel support structure and an optical device were described using the digital camera 2 as an example, but an optical device to which the technology disclosed herein can be applied is not limited to a digital camera, and encompasses all devices having an optical system. For instance, the technology disclosed herein can be applied to optical devices such as projectors, and not just to imaging devices such as cameras and video cameras.

In the above embodiment, the lens group 102 of the digital camera 2 was accommodated in the lens barrel 10, but part of the optical system of the optical device may be accommodated in the housing of the optical device, rather than in the lens barrel.

Also, in the above embodiment, light from the subject was incident on the lens group 102, but the optical system of the optical device may emit light to outside of the optical device. For example, when the optical device is a projector, the optical system of the projector emits light to the outside.

(4) In the above embodiment, the disposition positions of the first attachment portion 121, the second attachment portion 131, the third attachment portion 141, and the receiver 111 were set using the square SQ that circumscribed the outer edge E of the body frame 101 in a plane perpendicular to the X-axis, but the disposition positions of the attachment portions and the receiver 111 may be set using a rectangular shape other than the square SQ. That is, the square SQ is just an example of a rectangle. Therefore, all that matters is that the first attachment portion 121, the second attachment portion 131, the third attachment portion 141, and the receiver 111 are disposed on the inside of a rectangular shape that circumscribes the outer edge E of the body frame 101 in a plane perpendicular to the X-axis.

(5) In the above embodiment, displacement of the receiver 111 in the X-axis direction was limited by the second head 311a of the fourth screw 311, but displacement of the receiver 111 in the X-axis direction may be limited by a member other than a screw.

Also, in the above embodiment, the entire outer peripheral part of the second head 311a of the fourth screw 311 was disposed so as to come into contact with the fourth flange 115, but the fourth screw 311 may be disposed so as to come into contact with the forth flange 115 at just part of the outer peripheral part of the second head 311a. Here again, displacement of the fourth flange 115 in the X-axis direction can be limited by the fourth screw 311.

(6) In the above embodiment, the fourth flange 115 of the receiver 111 protrudes from the outer side surface of the body frame 101, and the fourth flange 115 was inserted into the stopper 211, but the reverse configuration is also possible, in which the stopper 211 protrudes and is inserted into the receiver 111. In this case, a concave portion into which the stopper 211 is inserted is formed at the outer peripheral part of the body frame 101, for example, as the receiver 111. Further, the stopper 211 and the receiver 111 are disposed with a gap in between, and so that they can come into contact. Again with this configuration, since the stopper 211 can support the receiver 111 if the lens barrel 1 should become distorted, the impact resistance of the lens barrel 1 can be improved.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the support structure of a lens barrel and the optical device equipped with the support structure. Accordingly, these terms, as utilized to describe the present invention should be interpreted relative to the support structure of a lens barrel and the optical device equipped with the support structure.

The term "configured" as used herein to describe a component, section, or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

The phrase "integrally formed" and the phrase "as a one-piece, unitary member" as used herein together refers to, for example, a molding process where all the parts are integrally formed together as one-piece.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicants, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A lens barrel support structure comprising:
   a base frame including a first support portion, a second support portion, a third support portion, and a stopper; and a lens barrel including a substantially cylindrical shape body frame configured to accommodate at least part of an optical system, a first attachment portion fixedly coupled to the body frame and the first support portion, a second attachment portion fixedly coupled to the body frame and the second support portion, a third attachment portion fixedly coupled to the body frame and the third support portion, and a receiver fixedly coupled to the body frame, the receiver and the stopper being disposed spaced apart and define a gap that extends along a first direction parallel to an optical axis of the optical system to allow the receiver to contact the stopper.

2. The lens barrel support structure according to claim 1, wherein
the receiver is a projection that extends outwardly from the outer side surface of the body frame, and
the stopper includes a first limiter and a second limiter disposed on the opposite side of the projection from the first limiter, the second limiter and the first limiters are configured to limit displacement of the projection in the first direction.

3. The lens barrel support structure according to claim 2, wherein the stopper further includes a third limiter disposed along the first direction between the first limiter and the second limiter, and
the projection defines a through-hole with an interior surface that extends along the first direction to accommodate at least part of the third limiter, the projection and the at least part of the third limiter are disposed spaced apart and define a gap between the interior surface of the through-hole and an exterior surface of the at least part of the third limiter to restrict movement of the projection in a direction perpendicular to the first direction.

4. The lens barrel support structure according to claim 3, wherein
a first dimension of the third limiter in the first direction is greater than a second dimension of the projection in the first direction.

5. The lens barrel support structure according to claim 3, wherein
the third limiter is integrally formed with the first limiter as a one-piece, unitary member and abuttingly disposed with the second limiter.

6. The lens barrel support structure according to claim 3, wherein
the third limiter is integrally formed with the second limiter as a one-piece, unitary member and abuttingly disposed with the first limiter.

7. The lens barrel support structure according to claim 6, wherein
the stopper further includes a stepped screw that has a first head part, a trunk part extending from the first head part, and a threaded part extending from the trunk part and fixed to the first limiter,
the first head part is formed by the second limiter, and
the trunk part is formed by the third limiter.

8. A lens barrel support structure comprising:
a base frame including a first support portion, a second support portion, a third support portion, and a stopper; and
a lens barrel including a substantially cylindrical shape body frame configured to accommodate at least part of an optical system, a first attachment portion fixedly coupled to the body frame and the first support portion, a second attachment portion fixedly coupled to the body frame and the second support portion, a third attachment portion fixedly coupled to the body frame and the third support portion, and a receiver fixedly coupled to the body frame,
the receiver and the stopper being disposed spaced apart and define a gap that extends along a first direction parallel to an optical axis of the optical system to allow the receiver to contact the stopper, and
the receiver, the first attachment portion, the second attachment portion, and the third attachment portion are disposed on the inside of a rectangular line that circumscribes the outer boundary of the body frame and forms a plane perpendicular to the first direction.

9. The lens barrel support structure according to claim 8, wherein
the first attachment portion, the second attachment portion, the third attachment portion, and the receiver are disposed at locations corresponding to mutually different apexes of the rectangular line.

10. The lens barrel support structure according to claim 1, wherein only one receiver is fixedly coupled to the body frame.

11. The lens barrel support structure according to claim 10, wherein
the first attachment portion, the second attachment portion, the third attachment portion and the receiver are integrally formed with the body frame as a one-piece, unitary member.

12. An optical device comprising an optical system and the lens barrel support structure according to claim 1.

13. The optical device according to claim 12, wherein only one receiver is fixedly coupled to the body frame.

* * * * *